(No Model.)
C. E. GRIFFITH.
WIRE FENCE FASTENER.
No. 294,615. Patented Mar. 4, 1884.
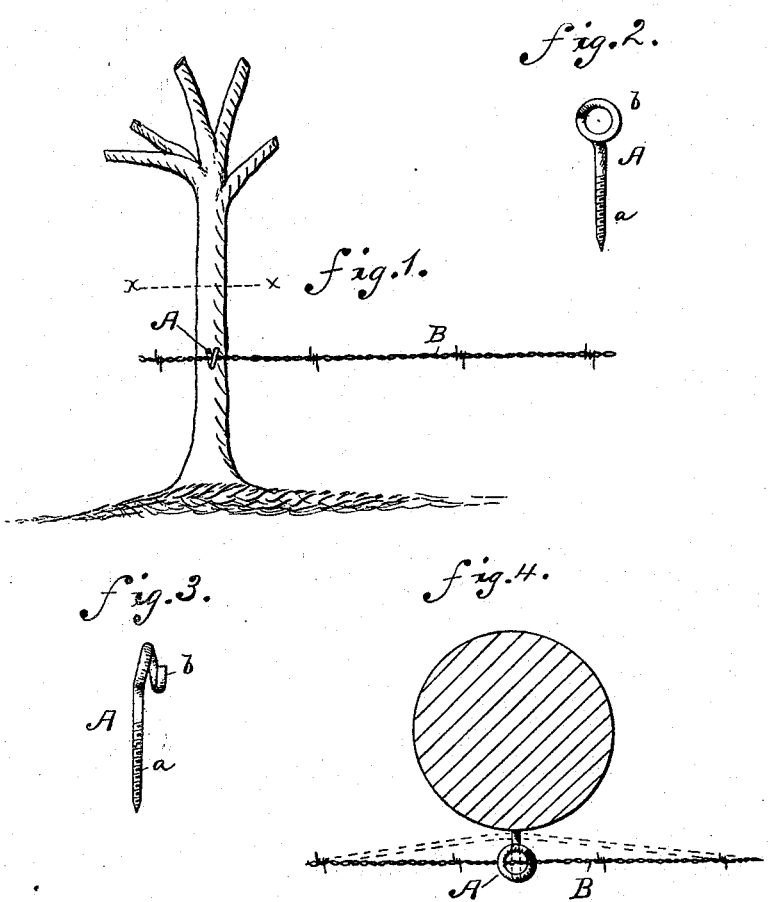
WITNESSES:
H. B. Brown
Edw. W. Byrn
INVENTOR:
Chas. E. Griffith
BY Munn & Co
ATTORNEYS.

UNITED STATES PATENT OFFICE.

CHARLES E. GRIFFITH, OF STORM LAKE, IOWA.

WIRE-FENCE FASTENER.

SPECIFICATION forming part of Letters Patent No. 294,615, dated March 4, 1884.

Application filed September 27, 1883. (No model.)

*To all whom it may concern:*

Be it known that I, CHARLES E. GRIFFITH, of Storm Lake, in the county of Buena Vista and State of Iowa, have invented a new and useful Improvement in Wire-Fence Fasteners; and I do hereby declare that the following is a full, clear, and exact description of the same, reference being had to the accompanying drawings, forming part of this specification, in which—

Figure 1 is a side view of a wire cable attached to a tree by my fastening. Figs. 2 and 3 are side and edge views of my fastening; and Fig. 4 is a plan view of the devices in horizontal section through the tree, showing in dotted lines the movements necessary to secure the cable.

My invention relates to fastenings for securing wire fences. In some portions of the West it is found desirable to fasten the wire cables to growing trees in the place of posts; but the wood of the trees gradually grows over the wire connections, and this not only prevents the readjustment of the wire, but damages the timber by weakening the tree, and also causes the wires to be broken by the swaying of the tree from the wind.

My invention consists of a screw having a spirally-curved eye designed to be used in connection with the wire cable, as hereinafter fully described.

In the drawings, A represents one of the fastenings, which consists of a screw-threaded shank, *a*, and an eye, *b*, formed by a spirally-curved and lapped end, the lap of the end, however, being offset, so as to leave an outlet from the eye.

B is one of the cable-wires of the fence, which is fastened to the tree in the following manner. The fastening A is screwed into the tree about the distance it is to go, and is then turned with its eye into a horizontal position, as in Fig. 4. The wire cable is then pressed inside of the eye of the fastening, as shown in dotted lines, Fig. 4, and allowed to spring back into the outlet from the eye, and the latter is then turned into a vertical position, as shown in dotted lines, Fig. 4, in which the wire cable rests properly in the eye at some distance from the body of tree. After the wood of the tree has grown so as to render a change of the fastening desirable, the eye is turned to a horizontal position and the wire cable pressed laterally through the outlet from the eye, and the fastening is then turned farther out and the wire again inserted; or the fastening may be entirely taken out and adjusted to a new place, to compensate for the vertical growth of the tree.

The advantages of this device are, first, its simplicity and low cost; secondly, its ease of adjustment; and, thirdly, the fact that it can readily be set farther from the tree, thus avoiding the covering of the wire by the wood and the incidental damage to both the fence and the tree; also the free loose longitudinal play of the wire through the eye, which prevents the swaying of the tree from producing breaking strains on the wire.

Having thus described my invention, what I claim as new is—

1. A fastening for wire fences, consisting of a screw-threaded shank, *a*, and a spirally-curved eye, *b*, having an offset and lapped end to form an outlet from the eye, substantially as shown and described.

2. The combination, with a wire-fence cable or strand, of the fastening A, consisting of a screw-threaded shank, *a*, and a spirally-curved eye, *b*, having an offset and lapped end, substantially as shown and described.

CHARLES E. GRIFFITH.

Witnesses:
F. H. BELL,
M. G. PERKINS.